United States Patent [19]

Butts et al.

[11] Patent Number: 5,046,383
[45] Date of Patent: Sep. 10, 1991

[54] ACCELERATION-BASED CONTROL OF POWER-ON CLUTCH-TO-CLUTCH UPSHIFTING IN AN AUTOMATIC TRANSMISSION

[75] Inventors: Kenneth R. Butts, Grosse Pointe Woods; Kumaraswamy V. Hebbale, Troy, both of Mich.; Kon-Well Wang, State College, Pa.

[73] Assignee: General Motors Corporation, Detroit, Mich.

[21] Appl. No.: 552,979

[22] Filed: Jul. 16, 1990

[51] Int. Cl.⁵ .............................................. B60K 41/22
[52] U.S. Cl. ........................................ 74/862; 74/866; 74/865
[58] Field of Search ......................... 74/866, 865, 862

[56] References Cited

U.S. PATENT DOCUMENTS

| | | | |
|---|---|---|---|
| 3,942,393 | 3/1976 | Forster et al. | 74/866 |
| 4,519,274 | 5/1985 | Maruyama et al. | 74/866 |
| 4,665,577 | 5/1987 | Greene | 74/866 X |
| 4,796,490 | 1/1989 | Butts et al. | 74/866 |
| 4,843,922 | 7/1989 | Kashihara | 74/866 |
| 4,855,913 | 8/1989 | Brekkestran et al. | 74/866 X |
| 4,875,391 | 10/1989 | Leising et al. | 74/866 |
| 4,967,957 | 5/1976 | Leising et al. | 74/866 |
| 5,653,351 | 3/1987 | Downs et al. | 74/866 |
| 5,821,190 | 4/1989 | Patil | 74/866 X |

Primary Examiner—Allan D. Herrmann
Assistant Examiner—William O. Trousdell
Attorney, Agent, or Firm—Mark A. Navarre

[57] ABSTRACT

An event-sequenced control for power-on clutch-to-clutch upshifting of a multiple speed ratio automatic transmission. The average output shaft acceleration during the fill period of the on-coming clutch is determined and used to compute a target acceleration value for the completion of the torque phase. The initial achievement of on-coming clutch torque capacity is detected when the input acceleration momentarily becomes negative or when the output acceleration drops by a first specified percentage of the difference between the initial and target values, whichever comes first. As such point, the reduction of the off-going clutch pressure is intensified but its slippage is limited to a near-zero value. An impending completion of the torque phase is detected when the output acceleration drops by a second specified percentage of the difference between the initial and target values. At such point, the off-going clutch is fully released, and a closed-loop control of the on-coming clutch is initiated to complete the torque phase and carry out the ensuing inertia phase. Engine torque controls are employed during the inertia phase to ensure a smooth output torque transition at the end of the shift, and to reduce the energy dissipated in the on-coming clutch.

10 Claims, 13 Drawing Sheets

FIG.12

ACCELERATION-BASED CONTROL OF POWER-ON CLUTCH-TO-CLUTCH UPSHIFTING IN AN AUTOMATIC TRANSMISSION

The present invention relates to an electronic control of a vehicular automatic transmission, and more particularly, to an acceleration-based control of power-on or positive torque upshifting.

BACKGROUND OF THE INVENTION

Event-sequenced electronic controls have been employed for automatic transmission clutch-to-clutch shifting as an alternative to strict open-loop or closed-loop controls. An example of an event-sequenced control for clutch-to-clutch downshifting is set forth in the Butts et al. U.S. Pat. No. 4,796,490, issued Jan. 10, 1989, and assigned to the assignee of the present invention. Such controls generally divide a shift into several successive control stages—entry into a given control stage being initiated in response to the detection of a predefined input speed or clutch slippage condition.

SUMMARY OF THE PRESENT INVENTION

The present invention is directed to an event-sequenced control for power-on or positive torque clutch-to-clutch upshifting involving several control steps in the torque phase of the shift, wherein entry into successive control stages is initiated in response to the achievement of specified criteria based on the acceleration of the transmission input and output shafts. Estimates of the shaft acceleration values are determined from simple shaft speed measurements through the use of a Kalman filtering technique.

An upshift is fundamentally separable into its fill, torque and inertia phases. In the fill phase, the torque establishing device to be engaged (referred to herein as the on-coming clutch) is filled in preparation for its engagement. In the torque phase, the torque establishing device to be disengaged (referred to herein as the off-going clutch) is progressively released to reduce its torque capacity, while the on-coming clutch is progressively applied to increase its torque capacity. The initiation of the inertia phase is marked by a consequent reduction of the input shaft speed, the shift being complete when the on-coming clutch is fully engaged. As indicated, the term "clutch", as used herein, generally refers to a fluid operated friction mechanism, such as a clutch or a band brake.

According to this invention, the average output shaft acceleration during the fill period of the on-coming clutch is determined and used to compute a target acceleration value for the completion of the torque phase. The initial achievement of on-coming clutch torque capacity is detected when the input acceleration momentarily becomes negative or when the output acceleration drops by a first specified percentage of the difference between the initial and target values, whichever comes first. At such point, the reduction of the off-going clutch pressure is intensified, but its slippage is limited to a near-zero value. An impending completion of the torque phase is detected when the output acceleration drops by a second specified percentage of the difference between the initial and target values. At such point, the off-going clutch is fully released, and a closed-loop control of the on-coming clutch is initiated to complete the torque phase and carry out the ensuing inertia phase. Engine torque controls are employed during the inertia phase to ensure a smooth output torque transition at the end of the shift and to reduce the energy dissipated in the on-coming clutch.

BRIEF DESCRIPTION OF THE DRAWINGS

FIG. 1b is a chart indicating the friction clutch engagement patterns required to establish the various speed ranges of the transmission depicted in FIG. 1a.

DETAILED DESCRIPTION OF THE DRAWINGS

Figure 1A:
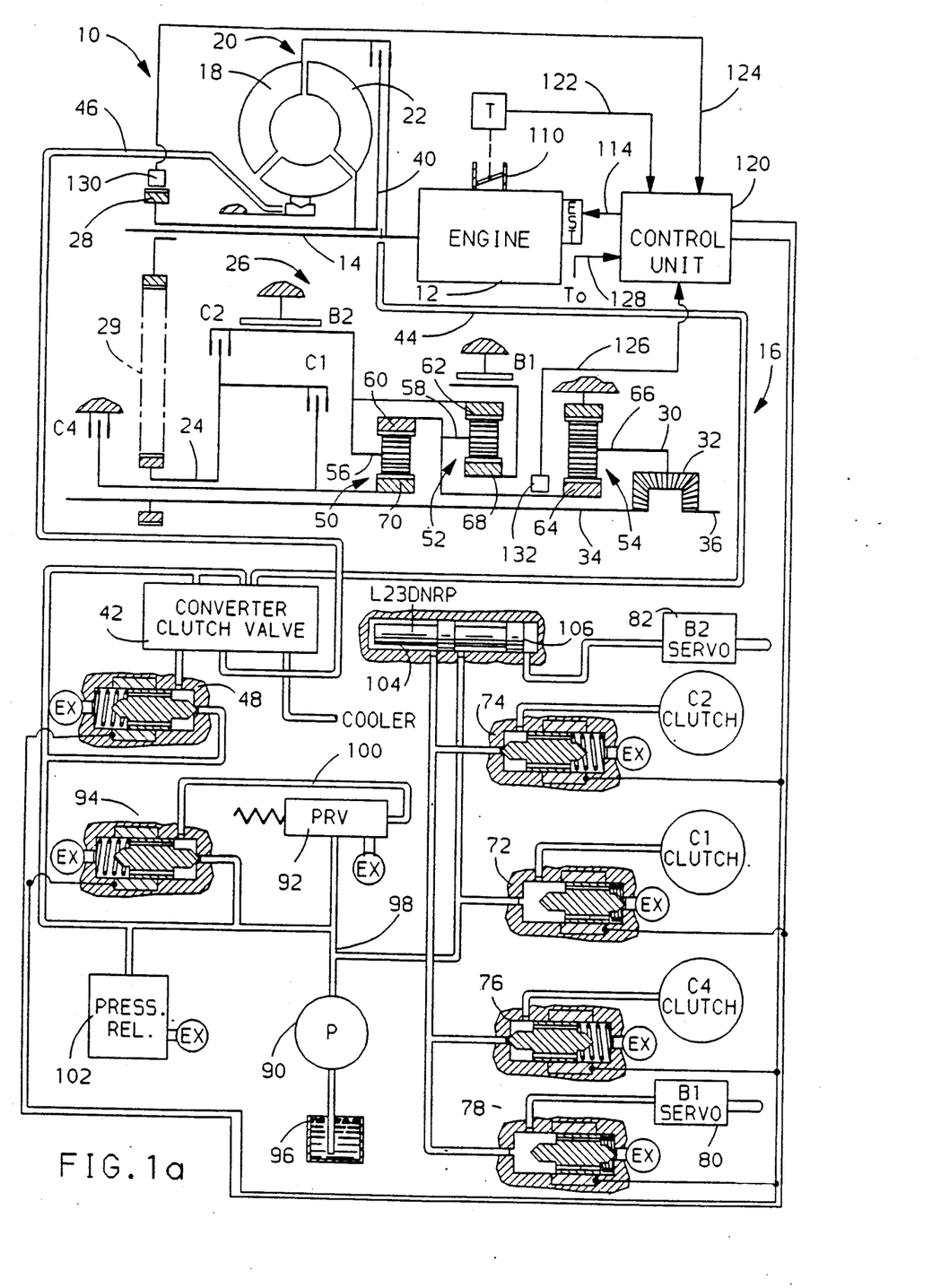
FIG. 1a is a diagram of a motor vehicle powertrain having an automatic transmission and engine controlled according to this invention by a computer-based controller.

Referring particularly to FIG. 1a, the reference numeral 10 generally designates a motor vehicle powertrain comprising an engine 12 connected to rotatably drive the input shaft 14 of an automatic transmission 16. The transmission input shaft 14 is connected to drive the impeller (input) 18 of a fluidic torque converter 20, and the turbine (output) 22 of torque converter 20 is connected to rotatably drive the input shaft 24 of a multi-ratio gearset 26 via the sprocket 28 and chain 29. The output shaft 30 of gearset 26, in turn, is connected to a differential gearset 32, the output shafts 34, 36 of which are connected to drive a pair of vehicle wheels (not shown).

The torque converter 20 also includes a clutch mechanism 40 engageable to mechanically couple the impeller 18 and turbine 22 during specified vehicle operating conditions. When open converter operation is desired, a converter clutch valve 42 supplies converter feed pressure on the release side of the clutch 40 via line 44. The return fluid is vented to a fluid cooler (not shown) via line 46. When closed converter or lock-up operation is desired, the valve 42 directs fluid pressure from the linear actuator 48 to the apply side of the clutch 40 via line 46, while exhausting the area between the clutch 40 and the housing of converter 20 via line 44.

The gearset 26 includes three planetary gearsets, as generally designated by the reference numerals 50, 52 and 54. The planet carriers 56/58 and ring gears 60/62 of gearsets 50/52 are cross-coupled as shown. The carrier and ring gear combination 58/60 provides an input to the sun 64 of gearset 54, the carrier 66 being connected to drive the output shaft 30. The carrier and ring gear combination 56/62 can be connected to the input shaft 24 via clutch C2 or grounded to the case of transmission 16 via the brake B2. The sun 68 of gearset 52 can be grounded to the case via brake B1; the sun 70 of gearset 50 can be grounded to the case of transmission 16 via clutch C4, or connected to the input shaft 24 via clutch C1.

Figure 1B:
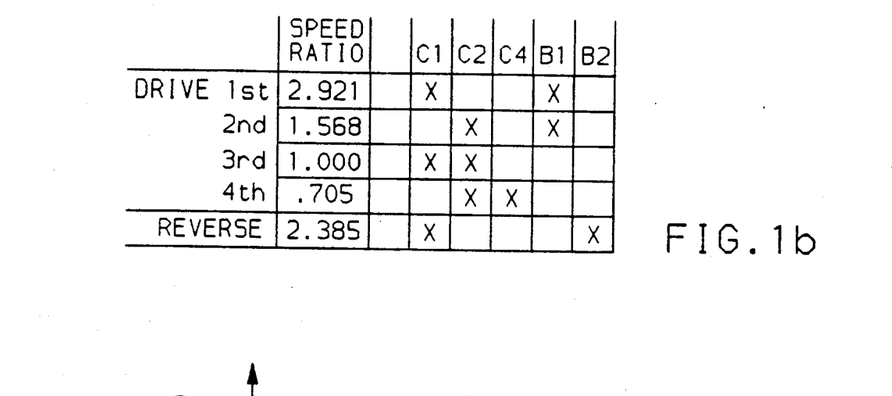

The clutches C1, C2, C4, B1 and B2 are selectively engageable according to the friction element state table of FIG. 1b to provide four forward ratios (1st, 2nd, 3rd and 4th) and one reverse ratio. As indicated in the lower right-hand portion portion of FIG. 1a, the supply of fluid pressure to the clutches C1, C2 and C4 is controlled by the linear actuator valves (LAVs) 72, 74 and 76, respectively; the brake B1 is controlled by LAV 78 and fluid operated servo 80; and the brake B2 is controlled by the manual valve 104 and fluid operated servo 82.

With four forward ranges, three upshifts are possible: 1-2, 2-3 and 3-4. The 1-2 upshift requires concurrent release of the C1 clutch and engagement of the C2 clutch. The 2-3 upshift requires concurrent release of the B1 brake and engagement of the C1 clutch. The 3-4 upshift requires concurrent release of the C1 clutch and engagement of the C4 clutch.

The operating fluid for torque converter 20, servos 80-82 and LAVs 48 and 72-78 is generated by a fluid supply circuit comprising a pump 90, a pressure regulator valve (PRV) 92 and the LAV 94. The pump draws fluid from the reservoir 96, providing pressurized fluid, referred to herein as line pressure, in line 98. The PRV 92 operates in response to a spring bias and a hydraulic bias to regulate the pressure in line 98 by returning a variable portion of the pump output to the reservoir 96. The hydraulic bias is developed by LAV 94, which supplies a controlled pressure to an end land of PRV 92 via line 100. A pressure relief valve 102 limits the line pressure at a predetermined value.

The line pressure developed by the pump 90 is supplied directly to the converter clutch valve 42, the LAVs 48 and 72, and the manual valve 104. The manual valve 104 directs line pressure to LAVs 74-78 and the servo 82 depending on the displacement of its valve spool 106. The spool 106 is mechanically coupled to an operator manipulated range selector (not shown), and is movable to one of seven detent positions corresponding to the transmission ranges. The detent positions, designated L, 2, 3, D, N, R and P, correspond to the 1st, 2nd, 3rd, 4th, Neutral, Reverse and Park ranges, respectively. Line pressure is supplied to the brake servo 82 when the spool 106 is positioned at the R detent. Line pressure is supplied to LAVs 74-78 when the spool 106 is positioned at the 1, 2, 3 or D detents.

The LAVs 48, 94 and 72-78 are single stage solenoid operated pressure regulating devices, each having an armature positioned as a function of the average current supplied to the respective solenoid coil. Due to the linear nature of the valve, substantially no pulsations occur in the supplied pressure signals.

The engine 12 includes throttle 110 adapted to be positioned by the vehicle operator for controlling the engine power output and an electronic spark timing (EST) module for setting the spark timing in accordance with an advance/retard signal on line 114.

The control of the engine EST module and the LAVs 48, 72-78 and 94 is performed by a computer-based control unit 120. In carrying out such control, the control unit 120 responds to various inputs, including a throttle position signal on line 122, a turbine speed signal on line 124, and an output speed signal on line 126. An indication of the engine torque output To may be supplied to the control unit on line 128.

The various input signals are obtained using conventional transducer technology. The throttle transducer T may be a potentiometer, and the speed transducers 130 and 132 may be conventional magnetic speed pick-ups. In the case of the turbine speed transducer 130, the pick-up may be positioned to cooperate with the teeth of chain sprocket 28; in the case of the output speed transducer 132, the pick-up may be positioned to cooperate with teeth formed on an output-related shaft as shown.

The control unit 120 contains conventional computer elements, including a microcomputer, memory elements for storing operating instructions and data, A/D converter elements for conditioning various analog inputs, and input/output elements for receiving and generating the various input and output signals. Flow diagrams representative of computer programs executed by the microcomputer in carrying out the control functions of this invention are described below in reference to the FIGS. 6-12.

Figure 2:
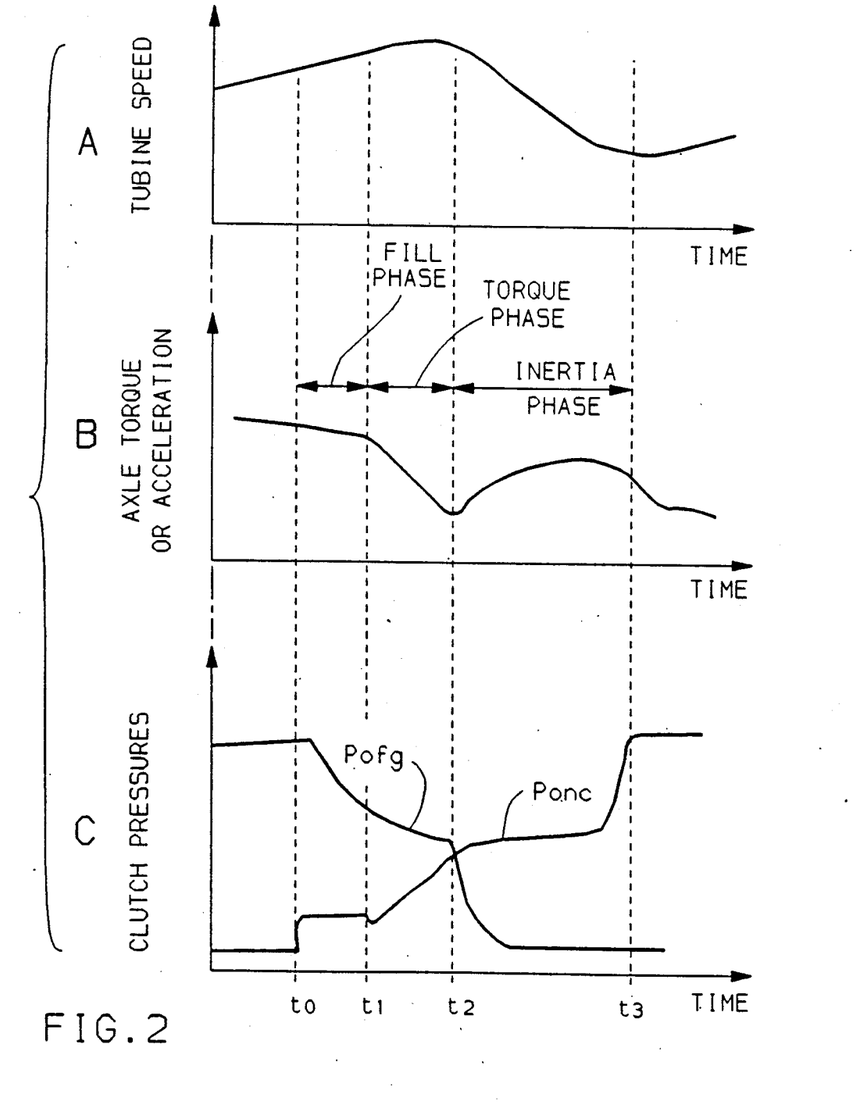
FIG. 2, Graphs A–C, depict a typical power-on clutch-to-clutch upshift of the transmission depicted in FIG. 1a, generally identifying the fill, torque and inertia phases of an upshift.

Referring to FIG. 2, the Graphs A-C depict on a common time base the turbine speed Nt, the transmission output torque or acceleration, and the commanded on-coming and off-going clutch pressures for a standard clutch-to-clutch power-on upshift. The shift is initiated at time t0 with the filling of the on-coming clutch. The commanded pressure Ponc during the fill period is predefined, and the fill continues for a predetermined duration. During the fill period, the pressure supplied to the off-going clutch Pofg is progressively reduced so that it can be quickly released when significant torque capacity of the on-coming clutch is achieved.

The torque phase begins at time t1, the end of the fill period, and the initiation of on-coming clutch torque capacity. During the torque phase the on-coming pressure Ponc is progressively increased while the release of the off-going pressure Pofg is continued. During this period, the transmission speeds do not change significantly, but the axle torque drops to a value determined by the speed ratios of the current and target ranges.

The inertia phase begins at time t2 when the turbine speed begins to turn down. In this phase, the off-going clutch is fully released, and the engine output torque is carried solely by the on-coming clutch. Rotating powertrain elements upstream of the on-coming clutch, such as the engine 12 and torque converter 20, are decelerated to their post-shift values; elements downstream of the on-coming clutch, such as the gearsets 50-54 and the output shaft 30, are accelerated, as indicated by the rising level of axle torque in Graph B. The inertia phase is terminated by full application of the on-coming clutch at time t3 when the elements achieve their post-shift speed values.

In controlling a clutch-to-clutch power-on upshift, it is critical to reliably detect the progress of the torque phase so that the off-going clutch can be released at the correct time. A substantial overlap or underlap of the clutch pressures will result in undesired torque transients in the form of a sharp decrease in the axle torque or engine speed flare, respectively.

Figure 3:
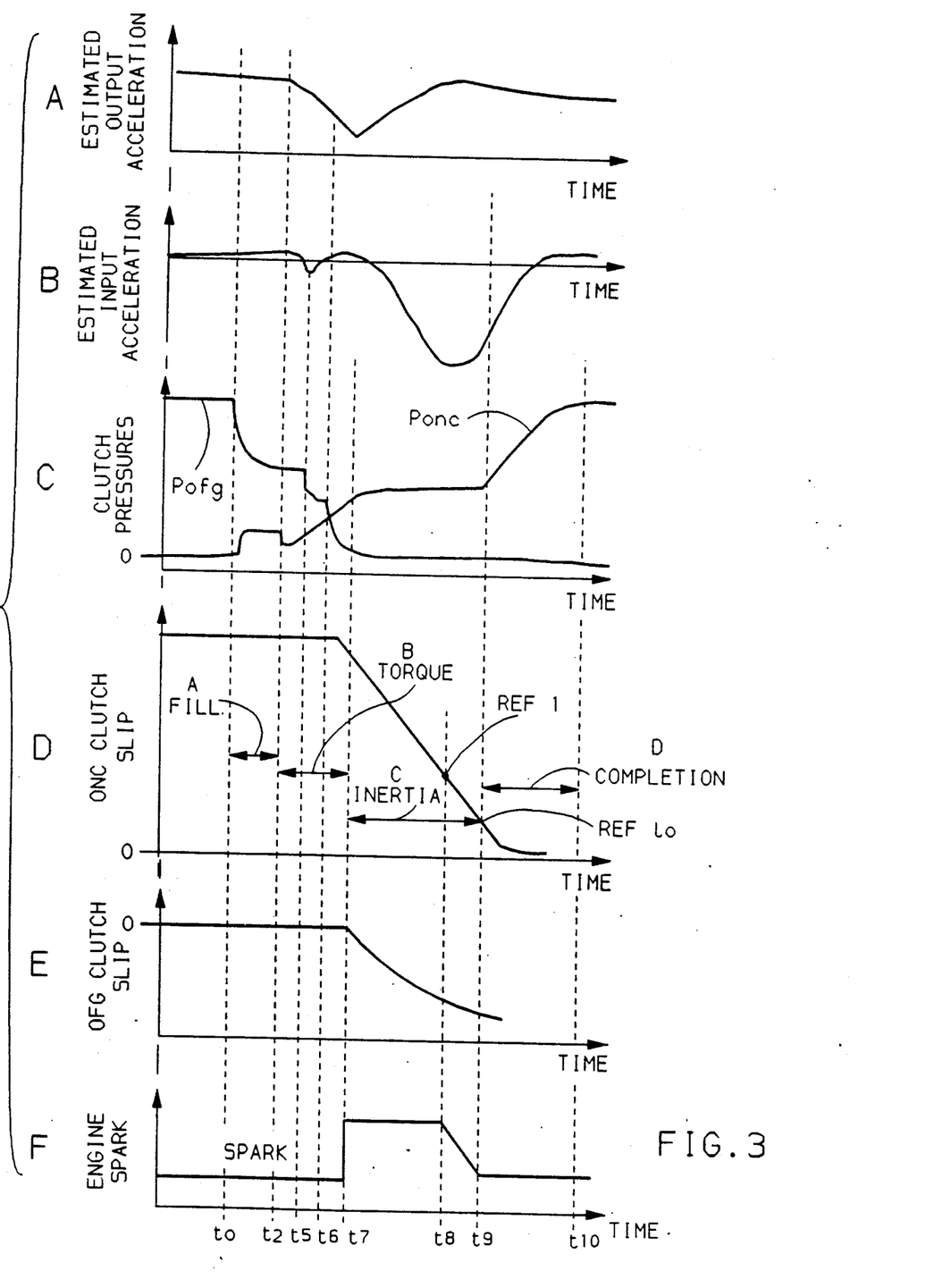
FIGS. 3–5 graphically depict a clutch-to-clutch upshift according to this invention.

FIG. 3 qualitatively illustrates a power-on clutch-to-clutch upshift according to this invention. On a common time base, Graphs A-F depict the estimated acceleration of output shaft 30 (Graph A) and input shaft 14 (Graph B), the on-coming and off-going clutch pressures (Graph C), the on-coming clutch slip (Graph D), the off-going clutch slip (Graph E) and the engine spark timing retard signal (Graph F).

Figure 4:
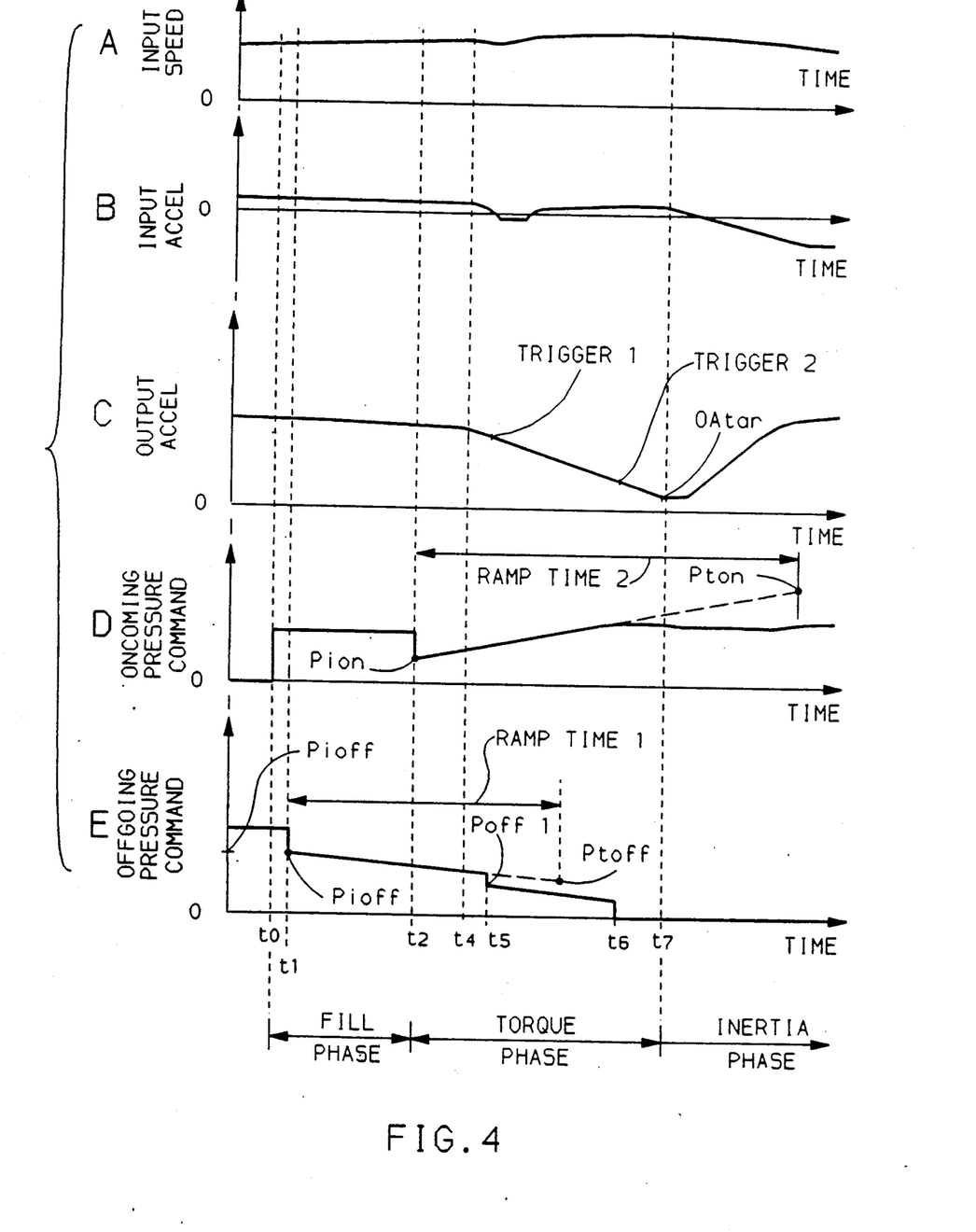
Figure 5:
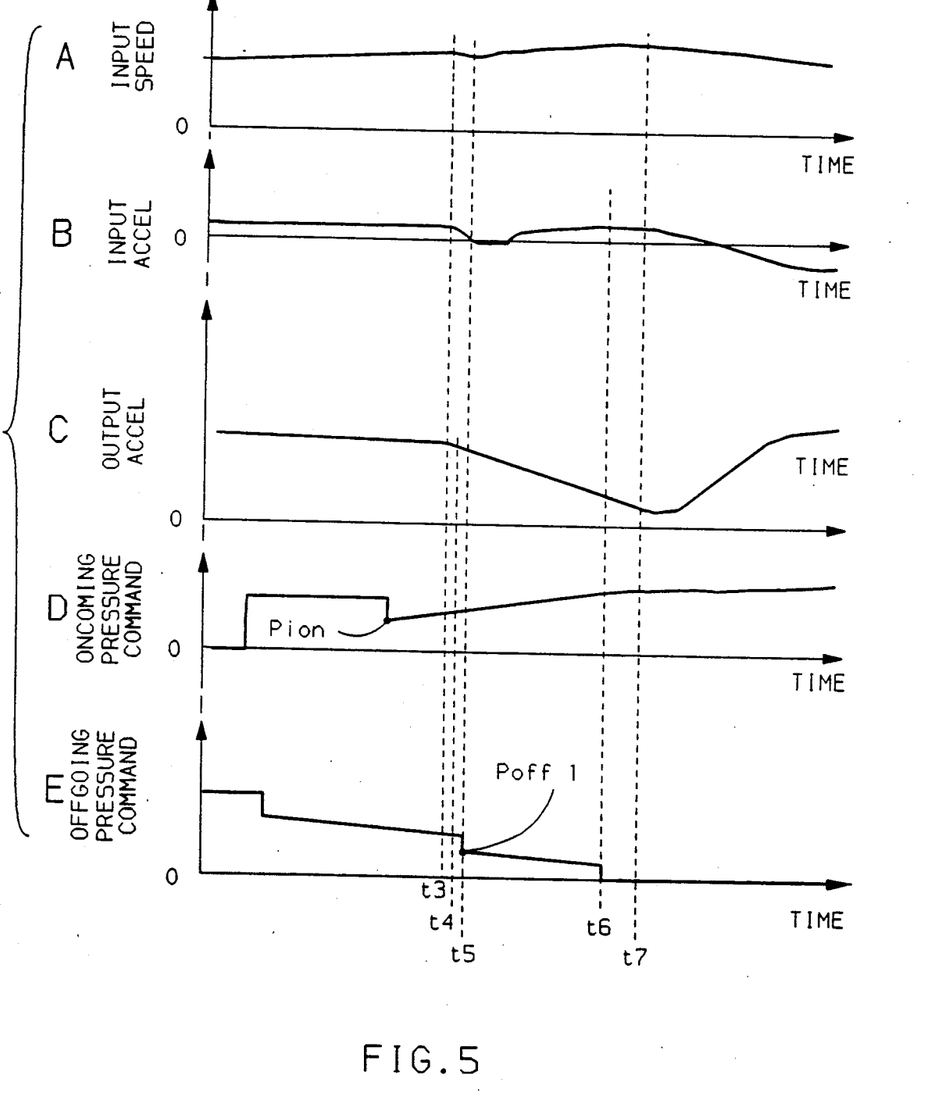

FIGS. 4 and 5 quantitatively define, respectively, the pressure control steps and the torque phase trigger points used to initiate successive pressure control steps. On a common time base, Graphs A-E in both Figures depict the measured turbine speed (Graph A), the estimated acceleration of input shaft 14 (Graph B) and output shaft 30 (Graph C), and the pressure commands for the on-coming clutch (Graph D) and off-going clutch (Graph E).

Through conventional shift pattern generation techniques, the control unit 120 determines that a power-on upshift is required, and the shift is initiated at time t0 with the start of the on-coming clutch fill phase. The fill time for each clutch and brake servo is a predefined pressure and temperature dependent quantity, which preferably is adaptively updated by a technique such as that disclosed and claimed in the to Downs et al. U.S. Pat. No. 4,707,789 issued Nov. 17, 1987, and assigned to the assignee of the present invention The commanded fill pressure is determined as a combined function of the torque vs. pressure characteristic of the on-coming clutch, the estimated gearset input torque and the rotating speed of the on-coming clutch.

A predetermined time after the start of the fill period the off-going clutch pressure command is reduced to an initial value, designated Pioff in FIG. 4. This initial reduction is simply intended to initiate a progressive ramp-down of the clutch pressure for reducing the off-going clutch torque capacity without producing off-going clutch slippage. If off-going clutch slippage does occur during the ramp-down, a back-up closed-loop control is initiated to hold the slip to a near-zero level. Pioff is an open-loop term, stored as a combined function of the torque vs. pressure characteristic of the off-going clutch, the estimated gearset input torque To and the rotating speed of the off-going clutch.

At the same time, the control unit 120 determines a target pressure Ptoff at which off-going slippage should occur, based again on the torque vs. pressure characteristic of the clutch, the estimated gearset input torque, and the rotating speed of the clutch. A suitable ramp period, RAMP TIME 1 in Graph E of FIG. 4, is selected as a function of the shift type (that is, 1-2, 2-3 or 3-4) and the particular clutch. The ensuing pressure ramp-down is carried out at a rate (slope) calculated to reach the target pressure Ptoff at the end of the ramp period. As illustrated in FIG. 4, the ramp-down period typically extends beyond the end of the fill phase, allowing for a certain amount of clutch overlap.

Also during the fill phase, the estimated acceleration of the gearset output shaft 30 is averaged and stored in the memory of control unit 120. The stored value thus also represents the average output acceleration at the initiation of the torque phase, and is designated herein as OAitp. Based on the stored value of OAitp, the speed ratio of the old range SR(old) and the speed ratio of the new range SR(new), the control unit 120 determines a target output acceleration value OAtar for the end of the torque phase. Algebraically, the target output acceleration OAtar is given by the expression:

$$OAtar = OAitp * SR(new)/SR(old)$$

Upon completion of the fill phase at time t2, the on-coming pressure command is reduced to an initial pressure Pion which is higher than the clutch return spring pressure. Then, the on-coming pressure command Ponc is ramped up in similar fashion to the ramp-down of the off-going clutch. In this case, the control unit 120 determines a target pressure Pton at which full engagement of the on-coming clutch should occur, based on the torque vs. pressure characteristic of the clutch, the estimated gearset input torque and the rotating speed of the clutch. Also, a suitable ramp period RAMP TIME 2 is selected as a function of the desired shift feel, the shift type and the involved clutch. The ensuing pressure ramp is carried out at a rate (slope) calculated to reach the target pressure Pton at the end of the ramp period.

The off-going and on-coming controls described above are essentially open-loop. In other words, the pressure controls are based on nominal transmission parameters with no interactive or real-time corrections specific to that powertrain other than the speed and input torque-related initializations. However, the below described acceleration-based event-sequencing of ensuing torque phase provides a level of interactive adjustment which compensates for any manufacturing variations, clutch wear and degradation, and so on, thereby to maintain consistently high quality shifting.

The graphs of FIG. 5 detail the acceleration-based triggers employed to sequence the various torque phase control steps. The first torque phase trigger TRIGGER 1 occurs shortly after a drop in the estimated input or output acceleration values is observed. As the on-coming clutch pressure builds in the early portion of the torque phase, the application of the on-coming clutch with the off-going clutch fully engaged produces an observable input deceleration, as seen at time t3 in Graph B. Shortly thereafter, the output acceleration starts to decrease, as seen at time t4 in Graph C. Specifically, the first trigger point is defined as the moment when (1) the estimated input acceleration IAest is observed to be negative for at least a predetermined interval, or (2) the estimated output acceleration OAest drops by a specified percentage P1 of the difference between the initial and target acceleration values OAitp, OAtar, whichever condition occurs first. In the example of FIGS. 3-5, conditions (1) and (2) occur concurrently at time t5.

When the first trigger point is detected, the off-going clutch pressure command is stepped down to an intermediate value Poff1 and then ramped down even further. In the illustrated embodiment the intermediate value Poff1 is a specified percentage P2 of the target value Ptoff and the previous ramp rate is maintained. If and when the step reduction or the ensuing ramp-down initiates off-going clutch slippage, a closed-loop control of the off-going pressure is initiated, as described above, to control the slippage to a near-zero value. In the example of FIGS. 4 and 5, no such slippage occurs. No adjustment of the on-coming pressure command is occasioned by a detection of the first trigger point.

The second trigger point TRIGGER 2 occurs as the estimated output acceleration approaches the target value OAtar. Specifically, the second trigger point is defined as the moment when the estimated output acceleration OAest drops by a second specified percentage P3 of the difference between the initial and target acceleration values OAitp, OAtar. In the example of FIG. 5, this condition occurs at time t6. In the event that the on-coming pressure command exceeds the target pressure Pton prior to the second trigger point, a time-based pressure ramp is initiated to force the second trigger condition.

When the second trigger point is detected, the off-going clutch pressure command is reduced to zero to fully release the clutch, and a closed-loop control of the on-coming clutch is initiated to promptly complete the torque phase and commence the inertia phase. In the first stage of this control, the closed-loop feedback term is the off-going clutch slippage and the desired slippage is set at a negative value. A second stage of the control is entered at time t7 when negative off-going slippage has been observed for a predetermined interval. After such point, the closed-loop feedback term is on-coming clutch slippage, the desired slip value being determined from a smooth time-based profile similar to that depicted in Graph D of FIG. 3. When the on-coming clutch slippage is less than a reference amount at time t9, the on-coming pressure command is ramped up to line pressure in open-loop fashion, completing the shift at time t10.

The engine control comprises a controlled retard of the spark timing during the inertia phase of the shift. When the second stage of the closed-loop on-coming pressure control is initiated at time t7, the engine spark is retarded in an amount to reduce the engine output torque by approximately 40%. The retard is ramped out at an open-loop rate beginning at time t8 when on-coming clutch slippage of less than a predetermined amount is observed, thereby ensuring a smooth torque transient upon completion of the shift.

Figure 6:
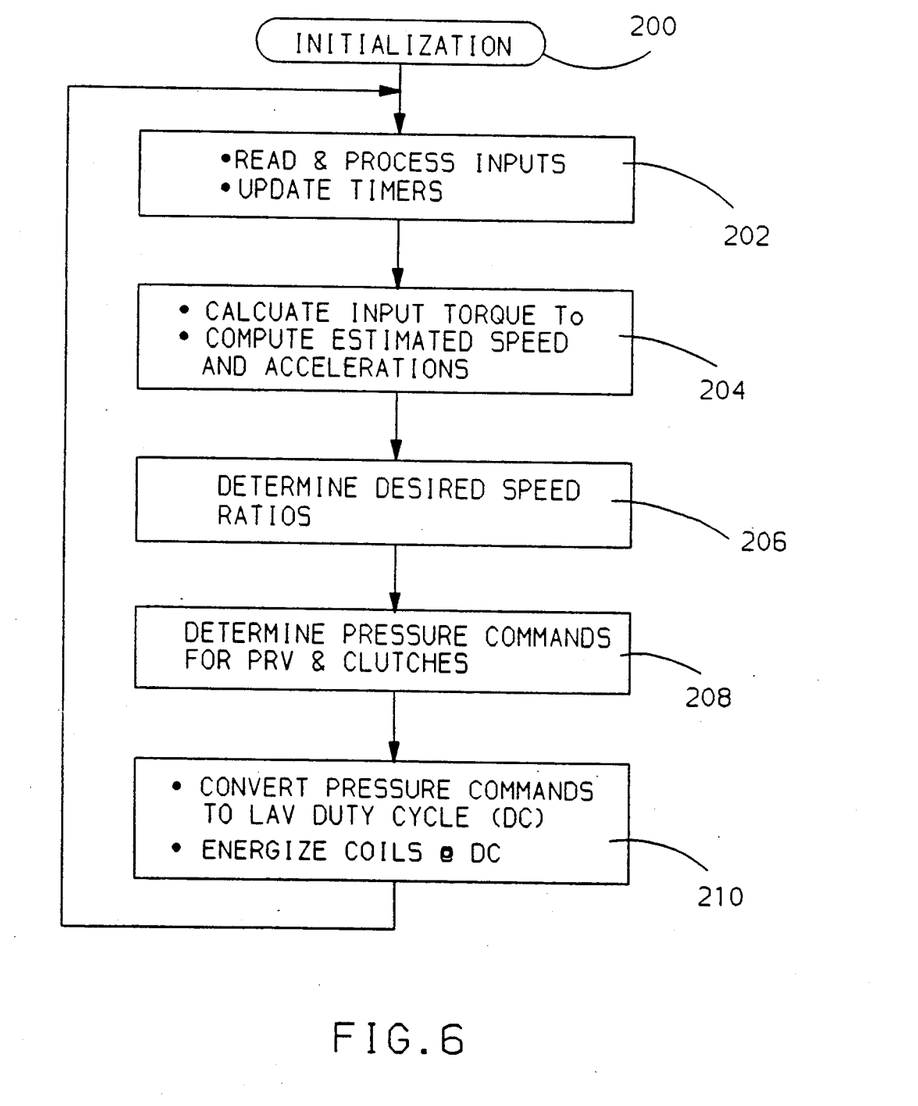
FIGS. 6–9, 10a–10b, and 11–12 flow charts representative of a computer program executed by the controller of FIG. 1a in carrying out the control of this invention.

The flow charts of FIGS. 6-12 represent a single computer program executed by the microcomputer of control unit 120 for carrying out the control of this invention. The main or executive loop is depicted in FIG. 6 and comprises the instruction blocks 202-210, which are repeatedly and sequentially executed during the operation of the vehicle, as indicated by the flow diagram lines. The block 200 designates a set of program instructions executed at the initiation of each period of vehicle operation for initializing the various registers, timers, etc., used in carrying out the control functions of this invention.

The block 202 reads and processes the various input signals applied to the control unit input/output device and increments the control timer units. The block 204 calculates various terms used in the control of this invention, such as transmission input torque To (if not otherwise available), and estimated speed and accelerations of input and output shafts 14, 30 from speed measurements. As indicated above, the speed and acceleration estimates are determined from the measured turbine (Nt) and output (No) speed data, using a Kalman filtering technique. For both turbine and output shafts, the Kalman equations for speed W, acceleration A, and jerk J are as follows:

$$W = W(last) + T*A(last) + H1*EE,$$

$$A = A(last) + T*J(last) + H2*EE, \text{ and}$$

$$J = J(last) + H3*EE$$

where the parenthetical "last" indicates a previously computed value, the terms H1, H2 and H3 are filter gain values, T is the sampling interval of the speed measurement N, and the term EE is an estimation error given by the expression:

$$EE = N - W(last) - T * A(last)$$

Block 206 determines the desired speed ratio based on inputs including throttle position, vehicle speed, and manual valve position. Block 208 determines clutch and band pressure commands for effecting a shift, if required. The pressure commands for pressure regulating valve PRV and nonshifting clutching devices are also determined. Block 210 converts the pressure commands to PWM duty cycle values for producing the required coil current in LAVs 48, 72-78 and 94.

Figure 7:
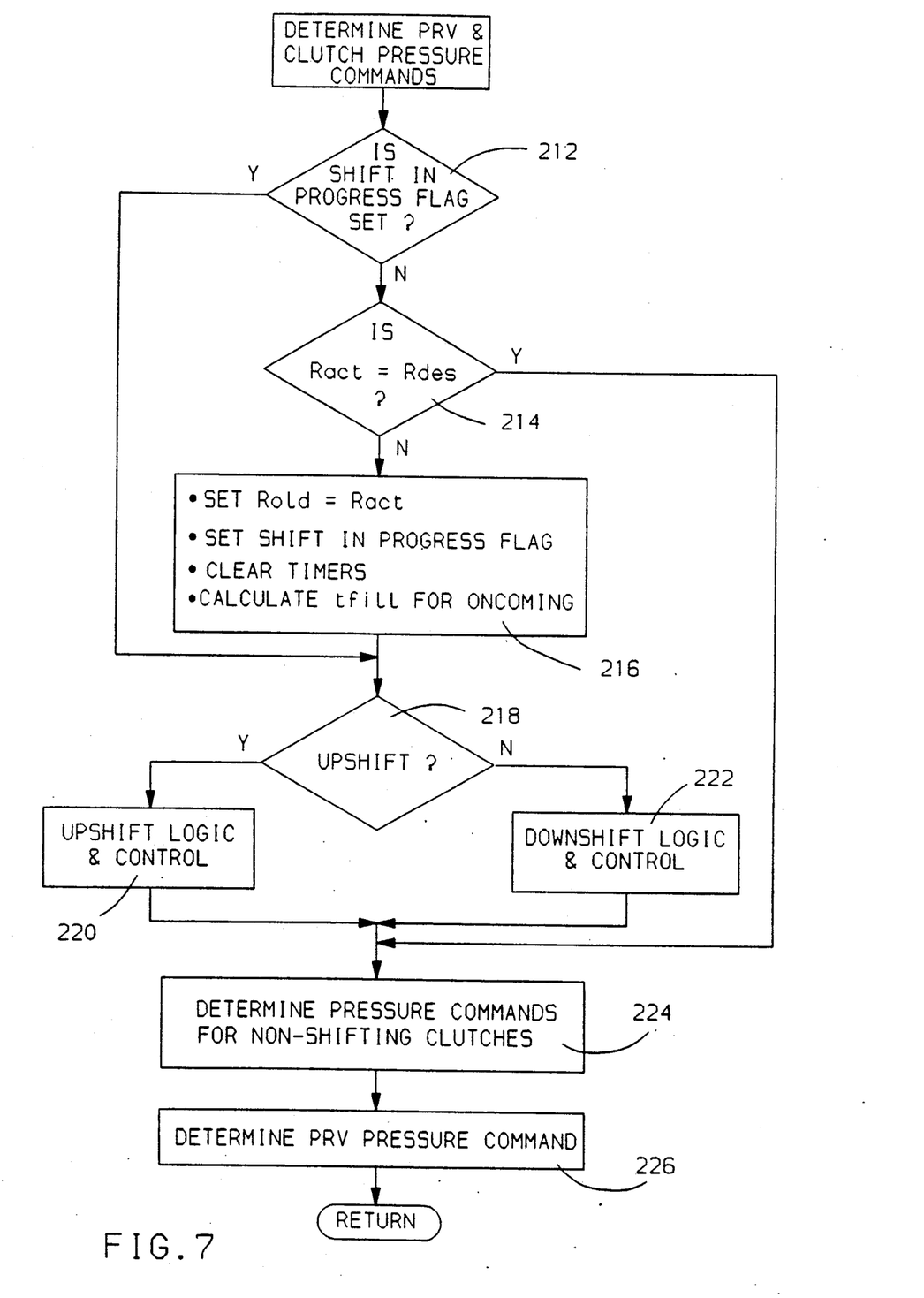

The flow diagrams of FIGS. 7-12 set forth the clutch and PRV pressure determination algorithm mentioned above in reference to block 208. Referring to FIG. 7, the decision block 212 determines if a shift is in progress, as indicated by the SHIFT IN PROGRESS flag. If the flag is set, the control jumps to block 218 and the appropriate pressure commands are developed for the clutching devices involved in the shift—block 220 for an upshift, or block 222 for a downshift. If the SHIFT IN PROGRESS flag is not set, the decision block 214 is executed to determine if the actual speed ratio is equal to the desired speed ratio. If the two ratios are the same, then shift is not required and the control jumps to block 224. If a shift is required, block 216 is executed to set up the initial conditions for a ratio shift. This block sets the old ratio Rold to the actual ratio Ract, sets the SHIFT IN PROGRESS flag, clears the shift timers, and computes the fill time tfill for the on-coming clutch. As indicated above, the fill time tfill is determined as a function of the fluid pressure and temperature. As above, the blocks 218-222 are then executed to compute the appropriate pressure commands for the clutching devices involved in the shift. Blocks 224 and 226 are then executed to determine pressure commands for the nonshifting clutches and the pressure regulating valve PRV.

Figure 8:
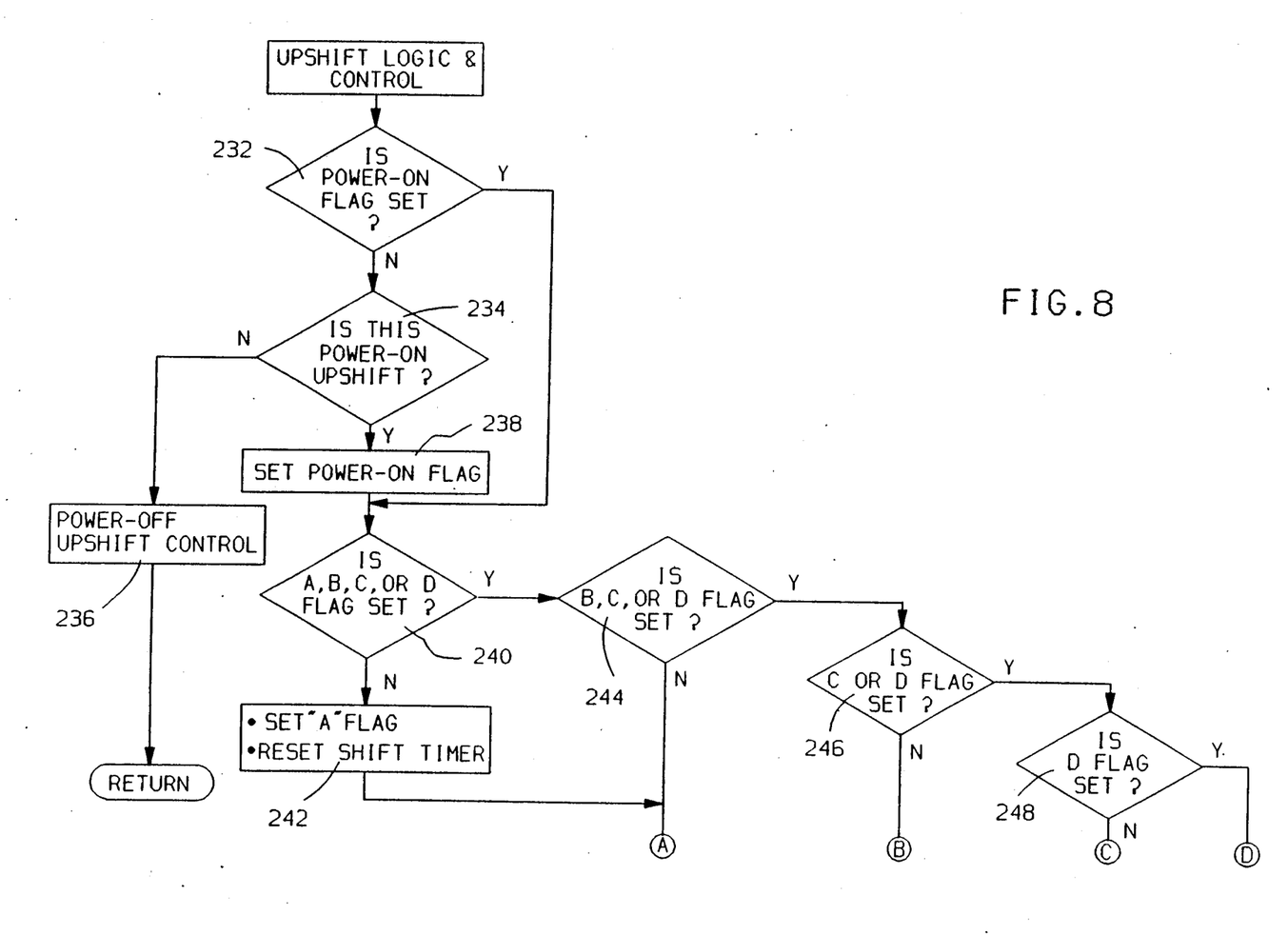

The block 220 instructions for developing actuator pressure commands and engine spark commands for a power-on upshift are set forth in further detail in the flow charts of of FIGS. 8-12. Referring to FIG. 8, the decision block 232 is first executed to determine whether a power-on upshift is already in progress. If the POWER-ON flag is not already set, decision block 234 determines whether the shift to be executed is a power-on or power-off type. If a power-off upshift is to be executed, block 236 is executed to carry out the shift. Since this invention is directed to a power-on upshift, the instructions for a power-on upshift are described in detail.

After setting the POWER-ON flag at block 238, the decision block 240 is executed to determine which phase of the power-on upshift is in effect. The four flags A, B, C and D are used to designate the active phase. Flag A represents the fill phase, flag B the torque phase, flag C the inertia phase, and flag D the completion phase. If none of the flags are set, it means that the shift has been just initiated and block 242 is executed to set flag A and to reset the shift timer. Decision blocks 244, 246 and 248 determine which set of control instructions have to be executed. The control instructions for the A phase of the shift are depicted in the flow chart of FIG. 9, the B phase in FIGS. 10a-10b, the C phase in FIG. 11 and the D phase in FIG. 12.

Figure 9:
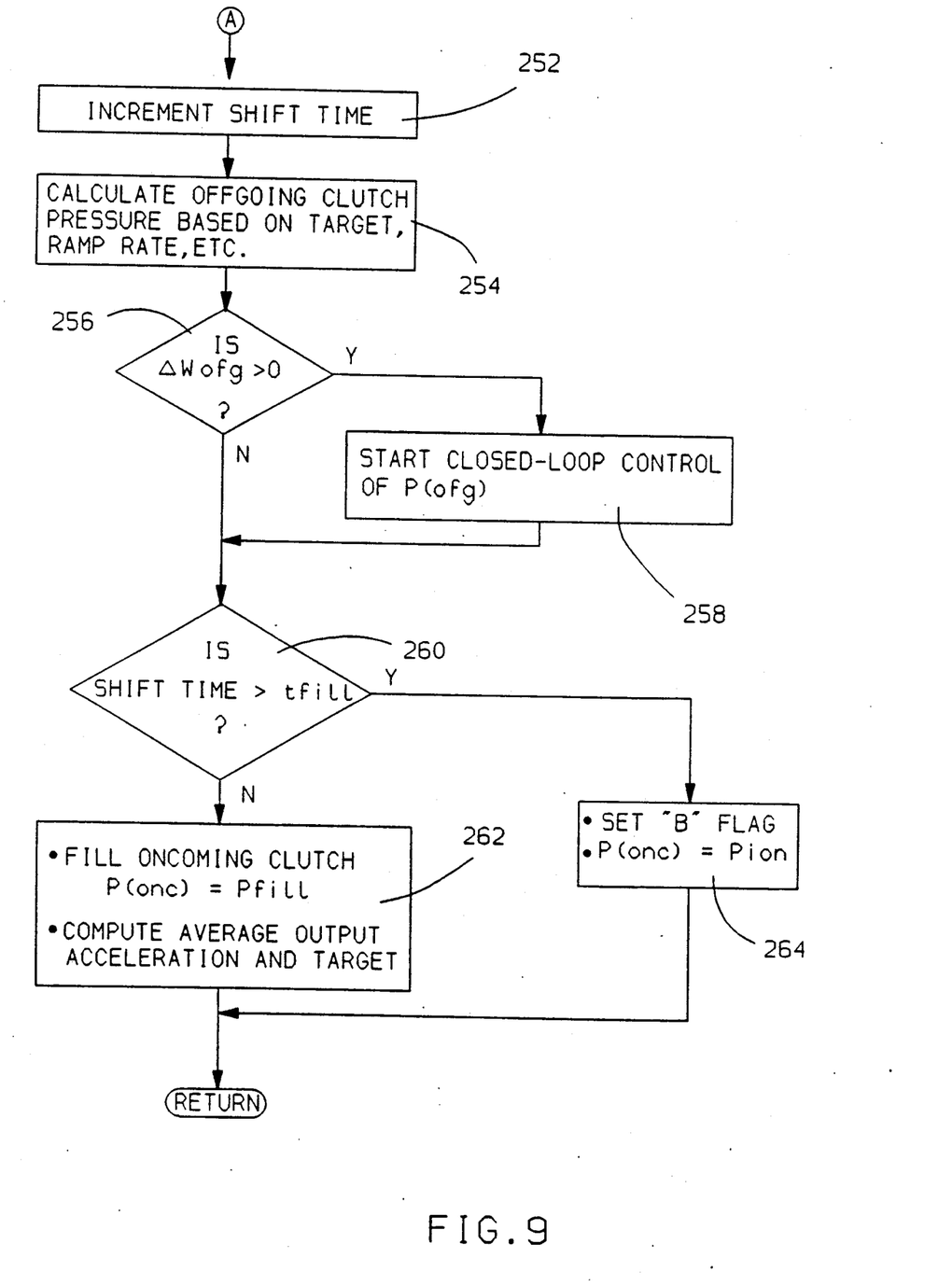

Referring to the fill (A) phase of FIG. 9, the block 252 is first executed to increment the shift timer. Block 254 then calculates the off-going target pressure Ptoff, a ramp time (RAMP TIME 1) and a ramp rate at which the pressure is to be reduced to target pressure Ptoff. The off-going clutch slippage is checked in block 256. If the clutch is slipping, then a closed-loop control of the off-going clutch pressure is initiated at block 258 with the feedback term being the off-going slip and the desired slip set to a near zero value. If the off-going clutch is not slipping, the decision block 260 is executed to determine if the fill (A) phase is completed, based on the fill time term tfill. If not, the block 262 is executed to set the on-coming clutch pressure command to a predetermined fill pressure Pfill, and to average the current output acceleration value A with previously determined fill phase values. The target acceleration value OAtar is determined based on the average acceleration OAitf and the actual and target gear ratios, as described above.

When the fill phase is complete, as determined by decision block 260, the block 264 is executed to set the B flag and to set the on-coming clutch pressure Ponc to a predetermined initial pressure Pion, which is sufficient to prevent the clutch return spring from pushing the clutch piston back, unfilling the clutch.

Figure 10A:
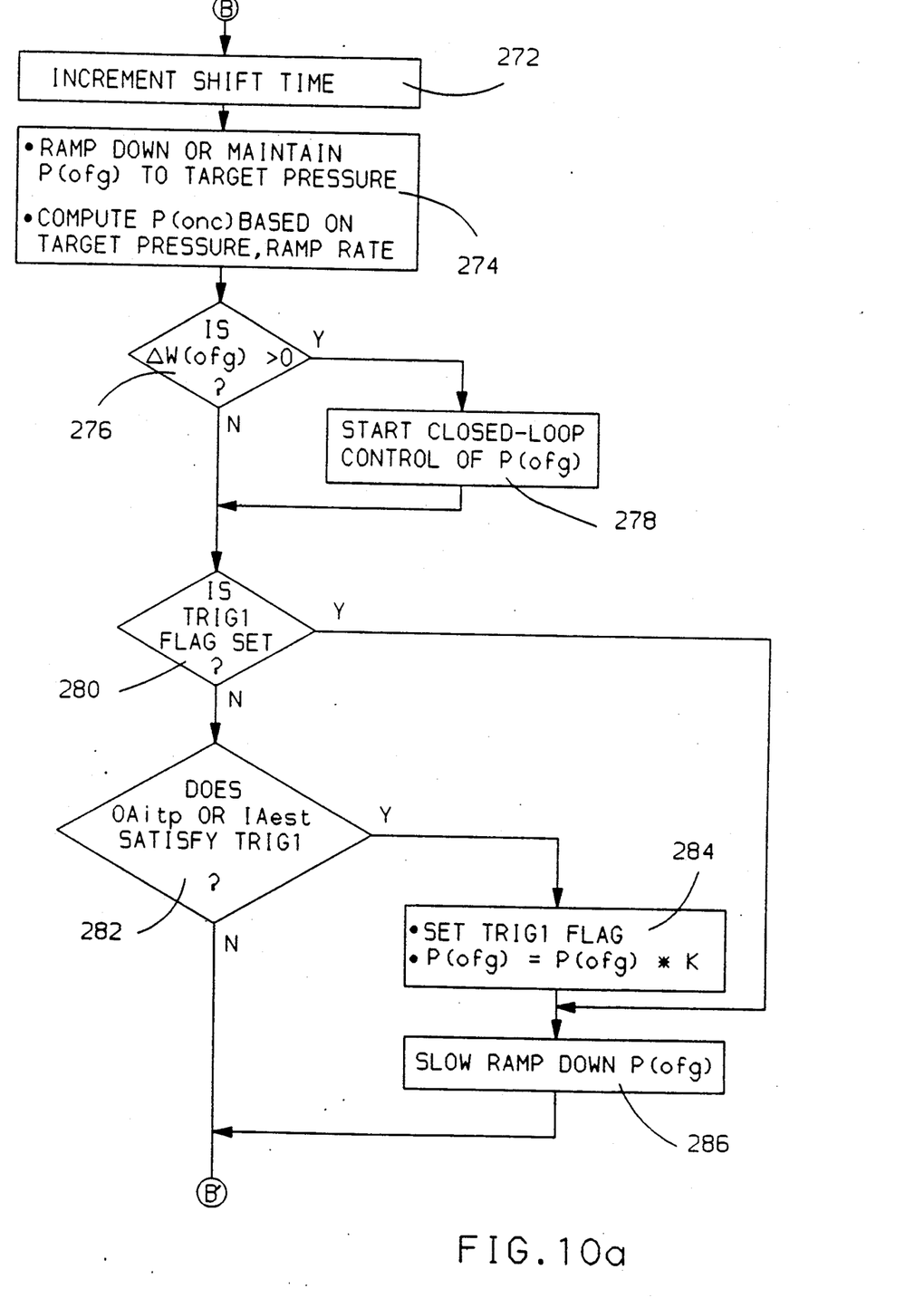
Figure 10B:
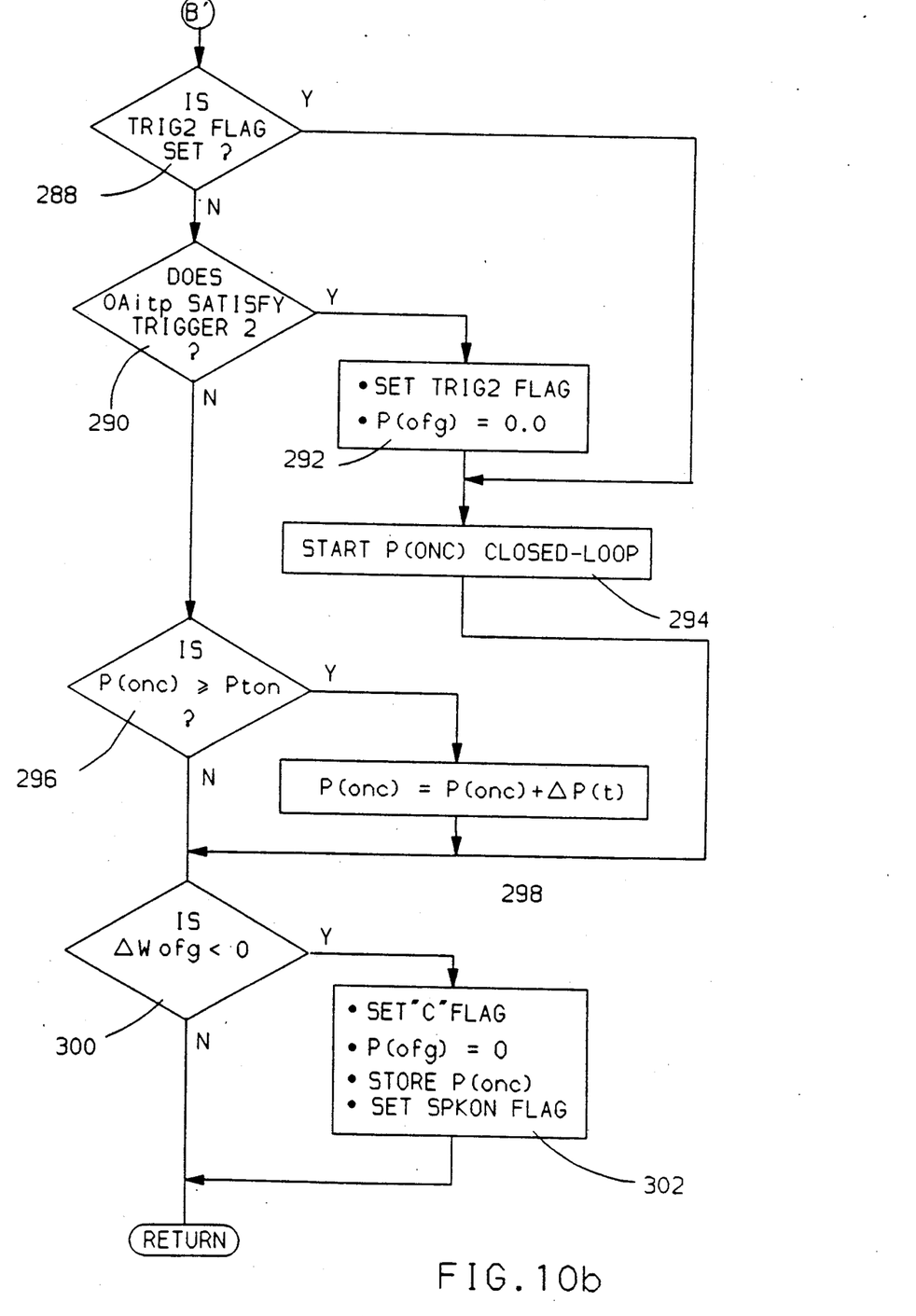

Referring to the torque (B) phase of FIGS. 10a-10b, the blocks 272 and 274 are first executed to increment the shift timer, and to determine the pressure commands for off-going and on-coming clutches. As indicated above in reference to FIGS. 3-5, the ramp of the off-going pressure is maintained unless the target Ptoff has already been reached, and the on-coming clutch pressure is ramped toward the target pressure Pton from the initial pressure Pion. This ramp rate is a function of desired shift feel, clutch speed, etc.

As with the fill phase, the blocks 276-278 initiate a closed-loop control of the off-going clutch pressure, if off-going clutch slippage is observed. Again, the closed-loop feedback term is off-going slip with a near zero desired value.

If the first acceleration based trigger (designated by the TRIG1 flag) has not yet occurred, as determined by block 280, the blocks 282-286 are executed. If the estimated input shaft acceleration IAest is observed to be negative for at least a predetermined interval, or the estimated output acceleration OAest drops by a specified percentage X1 of the difference between the initial and target acceleration values OAitf, OAtar (as determined at decision block 282), the blocks 284-286 are executed to set the TRIG1 flag, to step the off-going clutch pressure down to an intermediate pressure Poffi and to slow the off-going pressure ramp down. Thereafter, decision block 280 is answered in the affirmative and the slower ramp down is continued until the second acceleration-based trigger is activated If the second trigger (designated by the TRIG2 flag) has not yet occurred, as determined by block 288 of FIG. 10b, the blocks 290-294 are executed. If the estimated output acceleration OAest drops by a specified percentage X2 of the difference between the initial and target acceleration values OAitf, OAtar (as determined at decision block 290), the blocks 292-294 are executed to set the TRIG2 flag, to set the off-going pressure to zero, and to initiate a closed-loop control of the on-coming clutch pressure to complete the torque phase in a timely manner. Thereafter, decision block 288 is answered in the affirmative and the closed-loop control is continued for the duration of the torque phase. If, at any time before the second trigger, the on-coming clutch pressure command exceeds the target value Pton, a time-based ramp is imposed on the on-coming clutch pressure, as indicated by the blocks 296-298.

The end of the torque phase is signaled by the negative slip at the off-going clutch. When this occurs, as determined at block 300, the block 302 is executed to set the C flag, to set the off-going clutch pressure to zero (if already not set to zero), to store the on-coming clutch pressure command as a base pressure for inertia phase control, and to set the SPKON flag to indicate that engine spark retard is appropriate.

Figure 11:
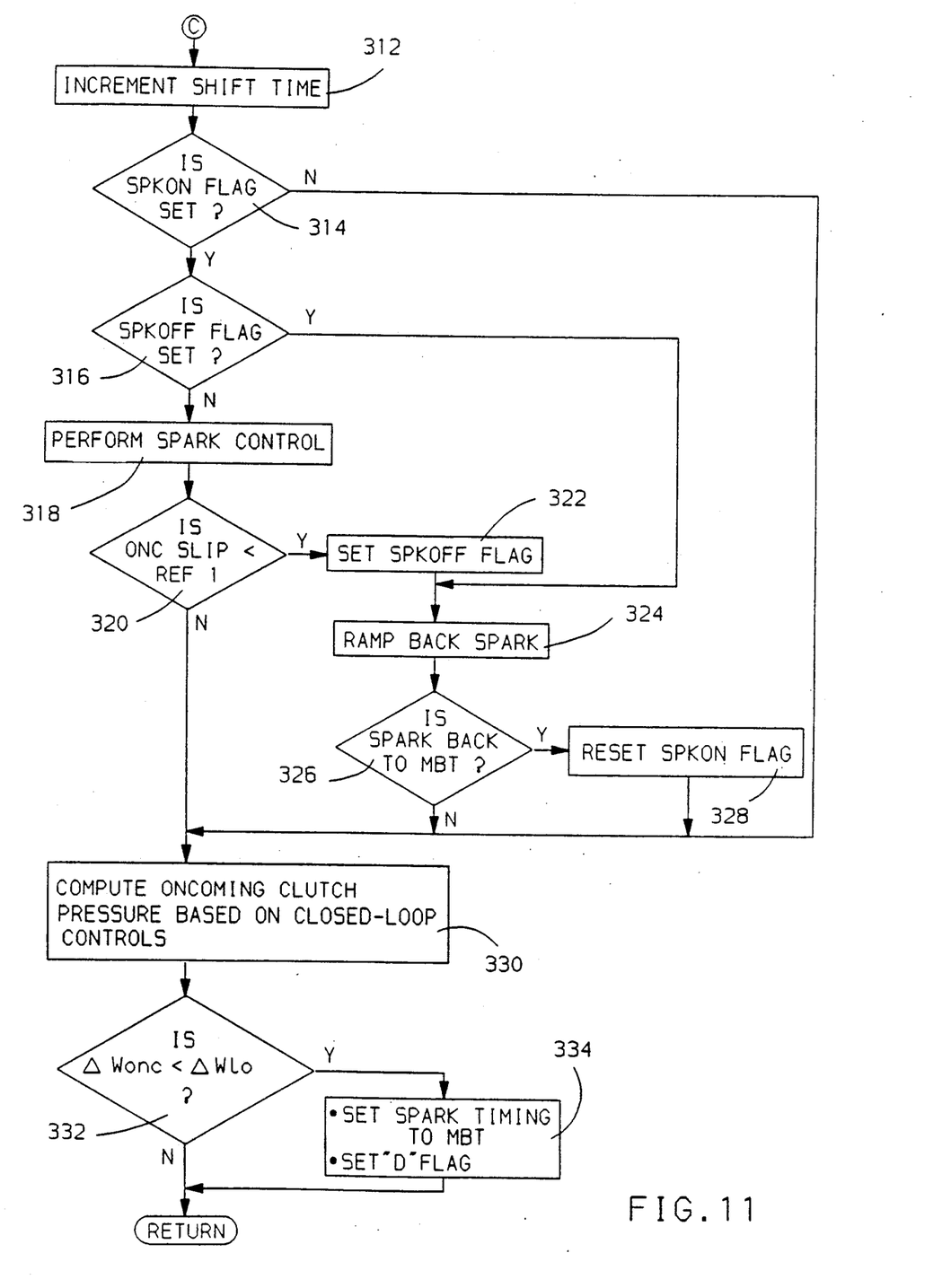

Referring to the inertia (C) phase of FIG. 11, the block 312 is first executed to increment the shift timer.

If the SPKON flag is set and the SPKOFF flag is not set, as determined by the decision blocks 314-316, the block 318 is executed to command spark timing retard, as described above in reference to Graph F of FIG. 3. When the on-coming clutch slip falls below a reference slip value (REF 1), as determined at decision block 320, the blocks 322-324 are executed to set the SPKOFF flag, and to ramp the spark timing back to the MBT (Minimum spark timing for Best Torque) value. In subsequent executions of the C phase routine, the decision block 316 will be answered in the affirmative, continuing the spark timing ramp until the MBT value is reached. Once the spark timing is ramped back to the MBT value, as determined at block 326, the block is executed to reset the SPKON flag. Thereafter, the decision block 314 will be answered in the negative and the blocks 316-328 will be skipped.

The C or inertia phase is also characterized by a closed-loop control of the on-coming clutch pressure as indicated at block 330. The control is based on a desired slip profile for smoothly engaging the clutch. The desired profile is a function of input torque, desired shift time and feel, and the speed at which the shift is initiated.

The on-coming clutch slip is also checked for a no-slip condition at block 332, signaling the end of the inertia phase. If the slip is below a specified value for more than a specified time period, the block 334 is executed to set the spark timing to the MBT value (if it not already at MBT) and to set the D flag.

Figure 12:
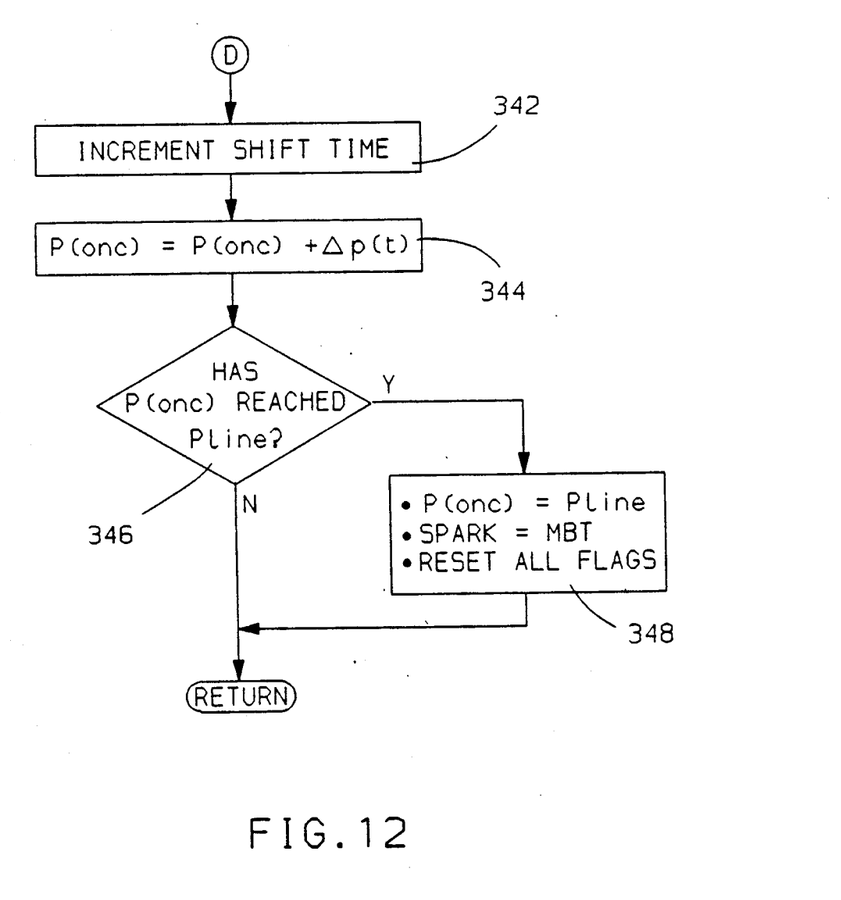

Referring now to the completion (D) phase of FIG. 12, the blocks 342-344 are first executed to increment the shift time and to initiate a ramp of the on-coming clutch pressure up to the line pressure in an open loop fashion, the ramp rate being a function of time. When the command pressure reaches line pressure, as determined at decision block 346, the block 348 is executed to set the on-coming pressure to line pressure Pline, to set the spark timing to MBT, and to reset all flags.

While this invention has been described in reference to the illustrated embodiment, it is expected that various modifications will occur to those skilled in the art. In this regard, it should be understood that controls incorporating such modifications may fall within the scope of this invention as defined by the appended claims.

The embodiments of the invention in which an exclusive property or privilege is claimed are defined as follows:

1. In a vehicle drivetrain including an engine connected to transmit torque to a drive axle through a multiple speed ratio power transmission, where upshifting from a lower speed ratio to an upper speed ratio involves (A) supplying fluid to an on-coming torque transmitting device associated with the upper speed ratio during a fill phase to prepare it for engagement, (B) increasing the pressure supplied to the on-coming device while reducing the pressure of an off-going torque transmitting device associated with the lower speed ratio to effect a transfer of torque capacity from the off-going device to the on-coming device during a torque phase, and (C) completing the engagement and disengagement of the on-coming and off-going devices during an inertia phase to complete the speed change of the upshift, the improvement wherein:

an initial acceleration value developed during the fill phase and indicative of the drive axle acceleration at the onset of the torque phase is used to compute a target acceleration value corresponding to the drive axle acceleration which is expected to occur at the end of the torque phase; and the progression of the drive axle acceleration from the initial value to the target value due to increasing torque capacity of the on-coming device during the torque phase is used to trigger successive reductions of the pressure supplied to the off-going device.

2. The improvement set forth in claim 1, wherein the target acceleration value is computed according to the product of the initial acceleration value and the ratio of the upper speed ratio to the lower speed ratio.

3. The improvement set forth in claim 1, wherein the pressure supplied to the off-going device during the torque phase is increased in an amount required to prevent it from slipping if such slippage is observed.

4. The improvement set forth in claim 1, wherein:

an input acceleration value corresponding to the acceleration of an input of the power transmission is measured during the shift; and a reduction in the pressure supplied to the off-going device during the torque phase of the shift is initiated when (1) the input acceleration value is observed to be negative for at least a predetermined interval, or (2) the reduction in drive axle acceleration exceeds a specified percentage of the difference between the initial and target acceleration values, whichever condition occurs first.

5. The improvement set forth in claim 1, wherein the pressure supplied to the off-going device is released when the reduction in drive axle acceleration during the torque phase exceeds a specified percentage of the difference between the initial and target acceleration values.

6. In a vehicle drivetrain including an engine, a drive axle, and a power transmission for transmitting engine torque to said drive axle at various speed ratios, where upshifting from a first speed ratio to a second speed ratio is carried out fluid pressure operated on-coming and off-going torque transmitting devices, respectively, the method comprising the steps of:

developing an initial acceleration value, based on an estimate of the average drive axle acceleration occurring during a fill phase of the shift in which the on-coming device is prepared for engagement;

computing a target acceleration value corresponding to the drive axle acceleration which is expected to occur when the engine torque has been transferred from the off-going device to the on-coming device; and initiating a torque phase of the shift by progressively increasing the pressure supplied to the on-coming device while reducing the pressure supplied to the off-going device in relation to the progression of the drive axle acceleration from said initial acceleration value to said target acceleration value.

7. The improvement set forth in claim 6, wherein the target acceleration value is computed according to the product of the initial acceleration value and the ratio of the second speed ratio to the first speed ratio.

8. The improvement set forth in claim 6, wherein the pressure supplied to the off-going device during the torque phase is increased in an amount required to prevent it from slipping if such slippage is observed.

9. The improvement set forth in claim 6, wherein:

an input acceleration value corresponding to the acceleration of an input of the power transmission is measured during the shift; and a reduction in the pressure supplied to the off-going device during the torque phase of the shift is initiated when (1) the input acceleration value is observed to be negative for at least a predetermined interval, or (2) the reduction in drive axle acceleration exceeds a specified percentage of the difference between the initial and target acceleration values, whichever condition occurs first.

10. The improvement set forth in claim 6, wherein the pressure supplied to the off-going device is released when the reduction in drive axle acceleration during the torque phase exceeds a specified percentage of the difference between the initial and target acceleration values.

* * * * *